E. J. PRINDLE.
MACHINE FOR MAKING LASTS.
APPLICATION FILED AUG. 14, 1901.

1,069,173.

Patented Aug. 5, 1913.
10 SHEETS—SHEET 3.

E. J. PRINDLE.
MACHINE FOR MAKING LASTS.
APPLICATION FILED AUG. 14, 1901.

1,069,173.

Patented Aug. 5, 1913.
10 SHEETS—SHEET 5.

E. J. PRINDLE.
MACHINE FOR MAKING LASTS.
APPLICATION FILED AUG. 14, 1901.

1,069,173.

Patented Aug. 5, 1913.
10 SHEETS—SHEET 6.

Fig. 9.

E. J. PRINDLE.
MACHINE FOR MAKING LASTS.
APPLICATION FILED AUG. 14, 1901.

1,069,178.

Patented Aug. 5, 1913.
10 SHEETS—SHEET 7.

Fig. 10.

Witnesses:
Jas. E. Hutchinson
Henry C. Hazard

Inventor
Edwin J. Prindle, by
Prindle & Russell, his Attys

UNITED STATES PATENT OFFICE.

EDWIN J. PRINDLE, OF WASHINGTON, DISTRICT OF COLUMBIA, ASSIGNOR, BY MESNE ASSIGNMENTS, TO UNITED SHOE MACHINERY COMPANY, OF BOSTON, MASSACHUSETTS, A CORPORATION OF NEW JERSEY.

MACHINE FOR MAKING LASTS.

1,069,173.　　　　Specification of Letters Patent.　　Patented Aug. 5, 1913.

Application filed August 14, 1901. Serial No. 72,031.

*To all whom it may concern:*

Be it known that I, EDWIN J. PRINDLE, of Washington, in the District of Columbia, have invented certain new and useful Improvements in Machines for Making Lasts, and do hereby declare that the following is a full, clear, and exact description thereof.

The object of my invention has been to provide a convenient and efficient machine for making lasts, substantially as hereinafter specified, and to such ends my invention consists in the machine for making lasts hereinafter specified.

Figures 1, 15:
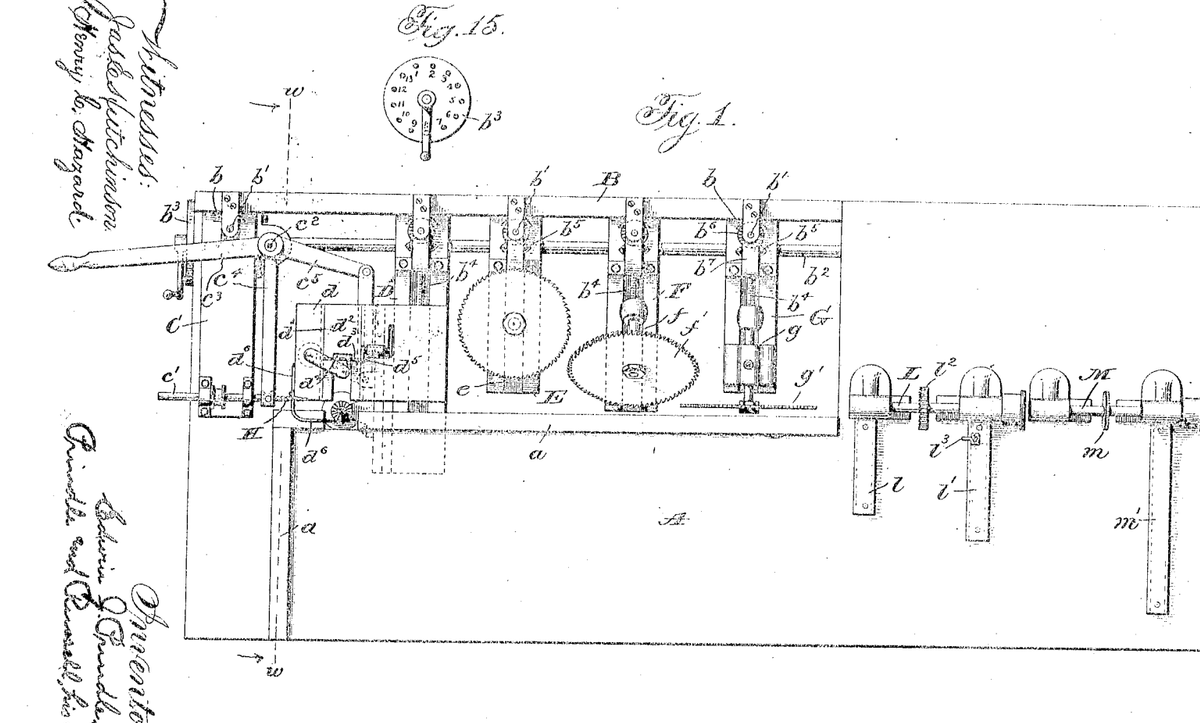
Figure 1 is a plan view of a machine embodying my invention.
Fig. 15 is an enlarged view of the scale plate and coöperating crank.
Figure 2:
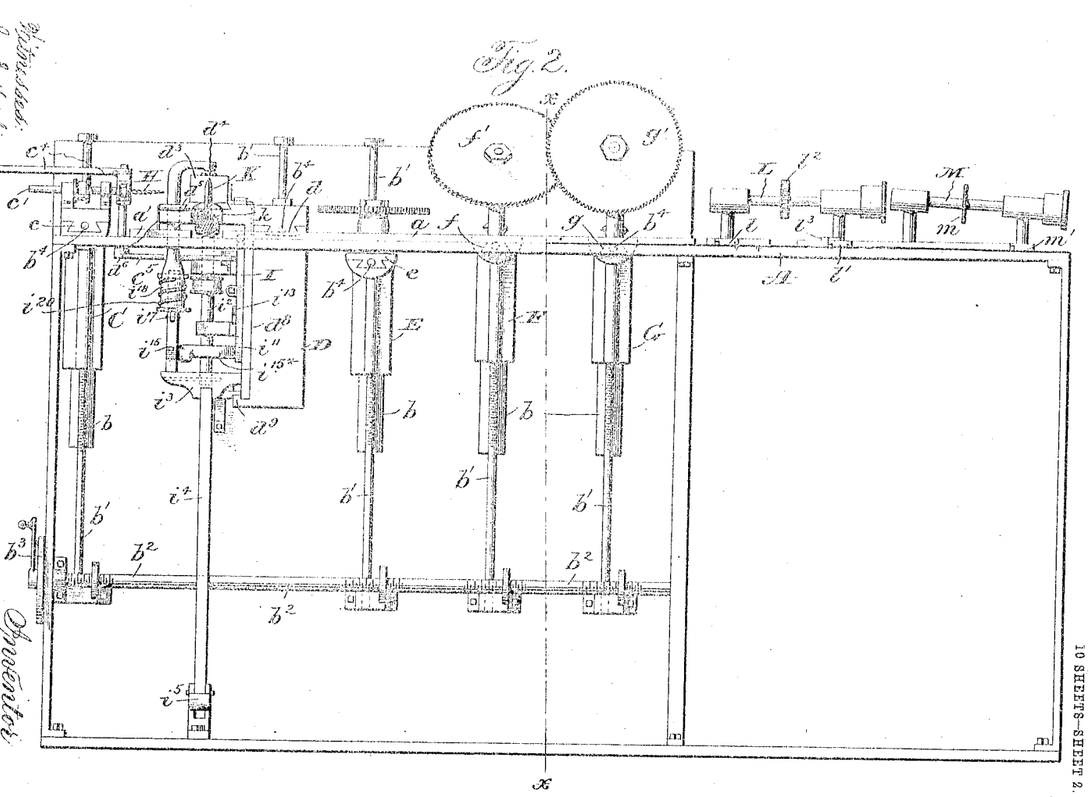
Fig. 2 is a front elevation of the same.
Figure 3:
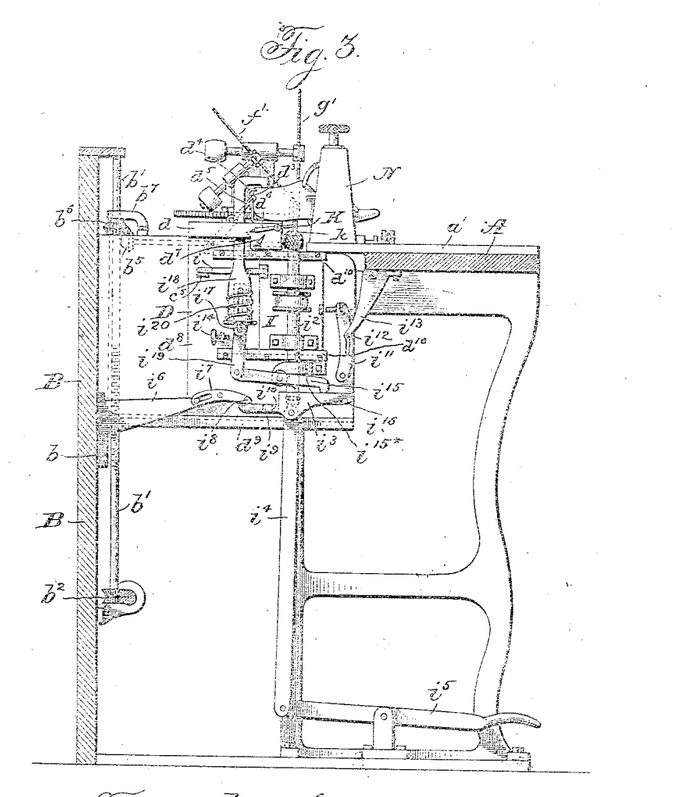
Fig. 3 is a vertical, sectional view of the same taken on the line $w$—$w$ of Fig. 1.
Figure 4:
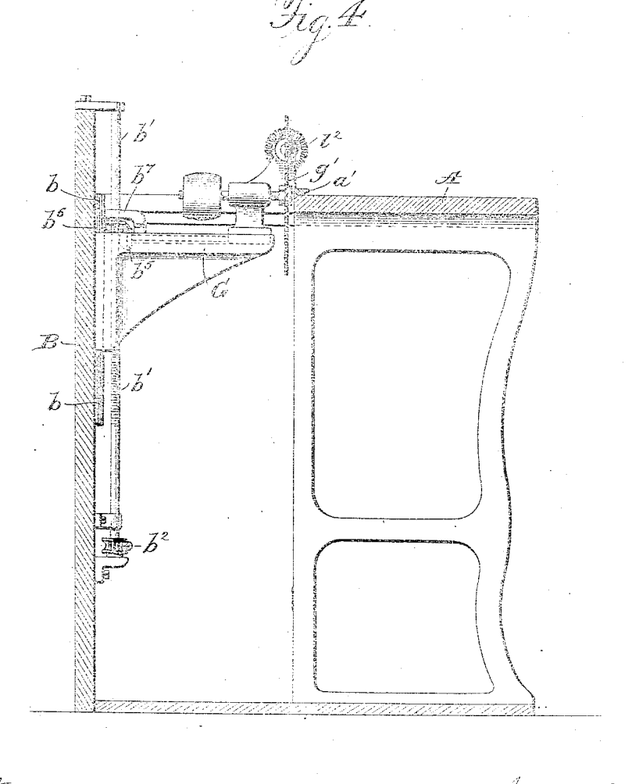
Fig. 4 is a view taken on the line $x$—$x$ of Fig. 2.
Figures 5, 6:
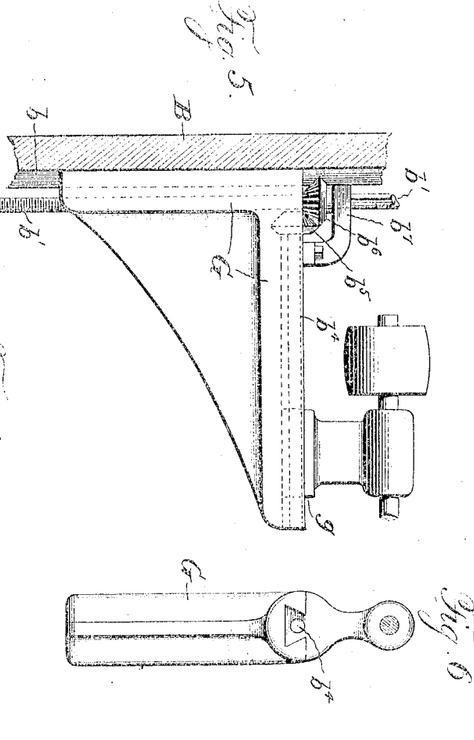
Figs. 5, 6 and 7 are details of a bracket in the machine.
Figure 7:
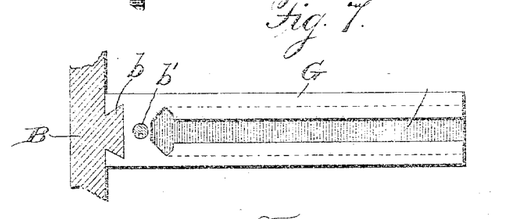
Figure 8:
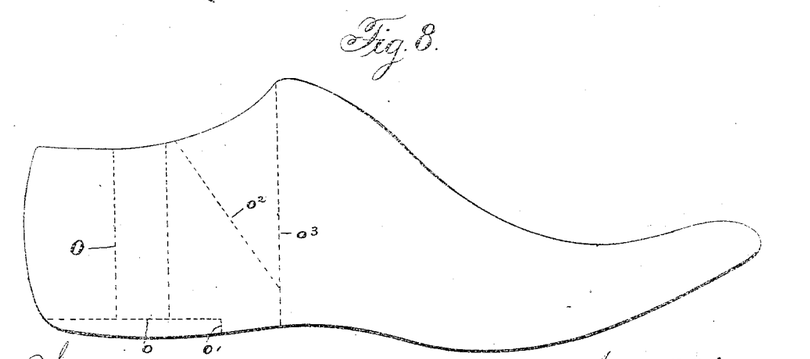
Fig. 8 is an elevation of the last showing in dotted lines the various saw-cuts and spindle hole.
Figure 9:
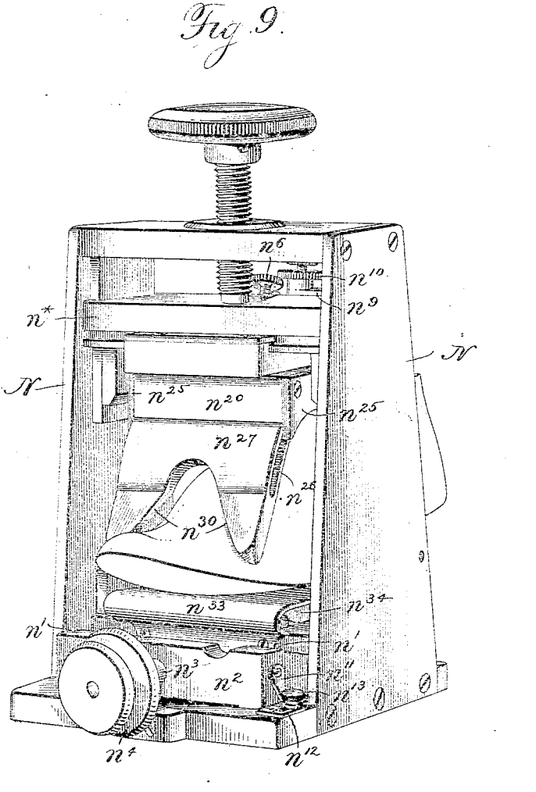
Figs. 9, 10 and 11 are perspective views of the clamp used in the above illustrated machine.
Figure 10:
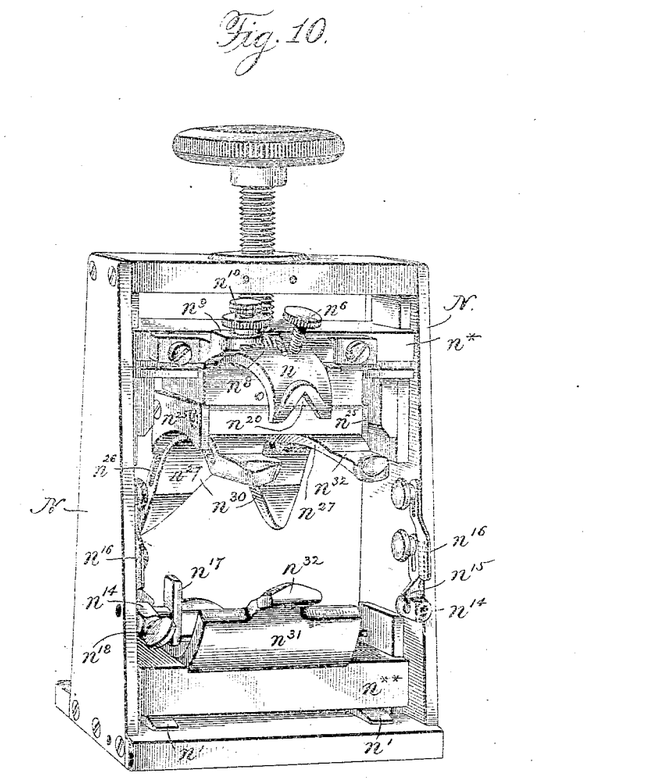
Figure 11:
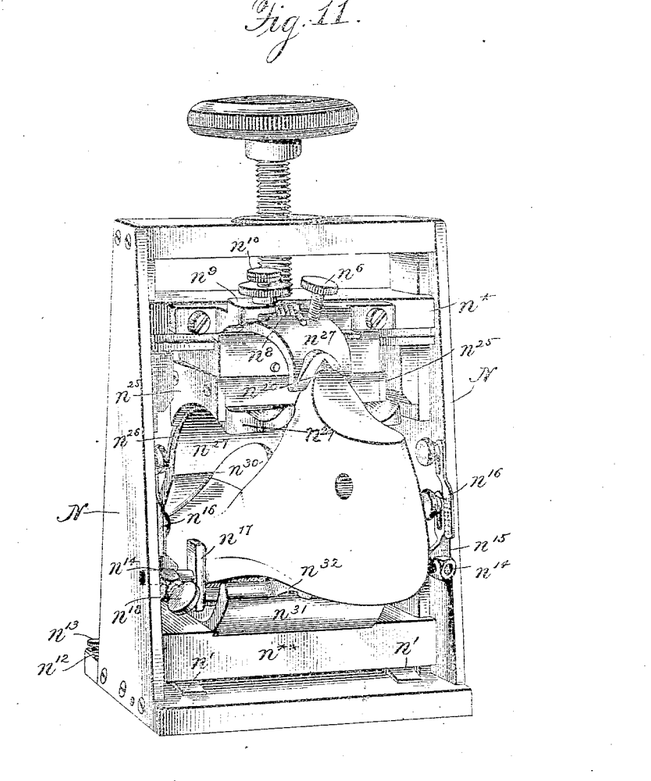
Figure 12:
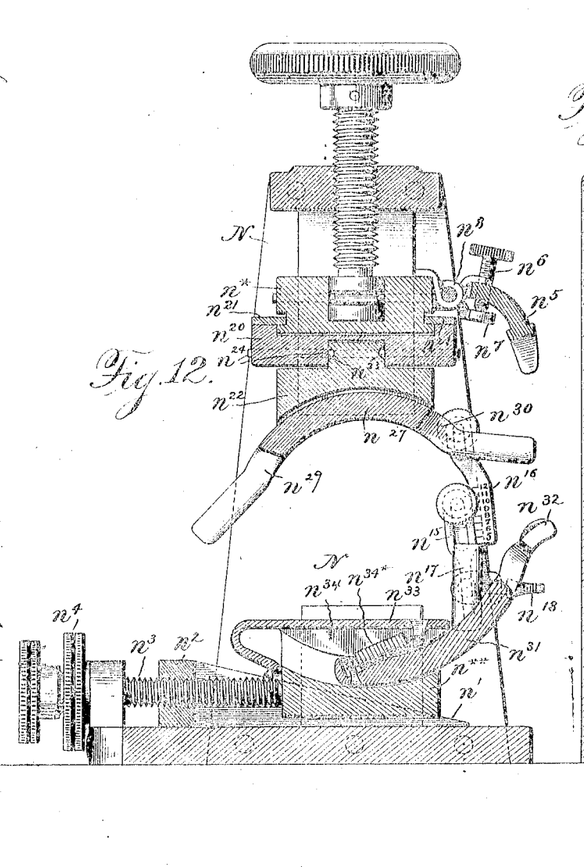
Fig. 12 is a longitudinal vertical sectional view.
Figure 13:
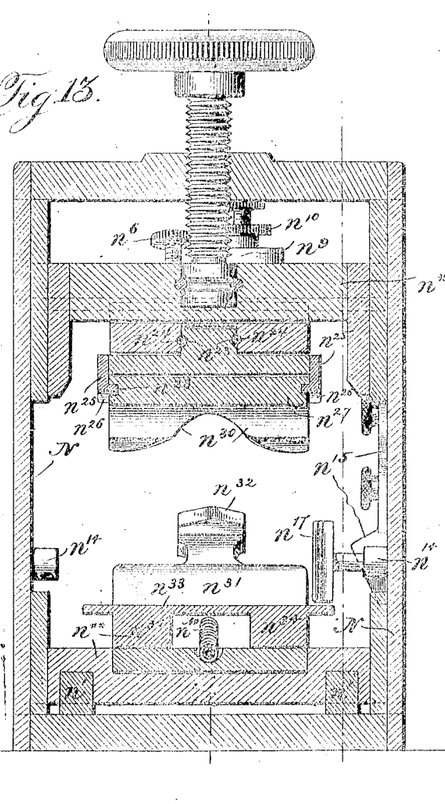
Fig. 13 is a transverse vertical sectional view of the clamp above-mentioned, there being no last in the clamp.
Figure 14:
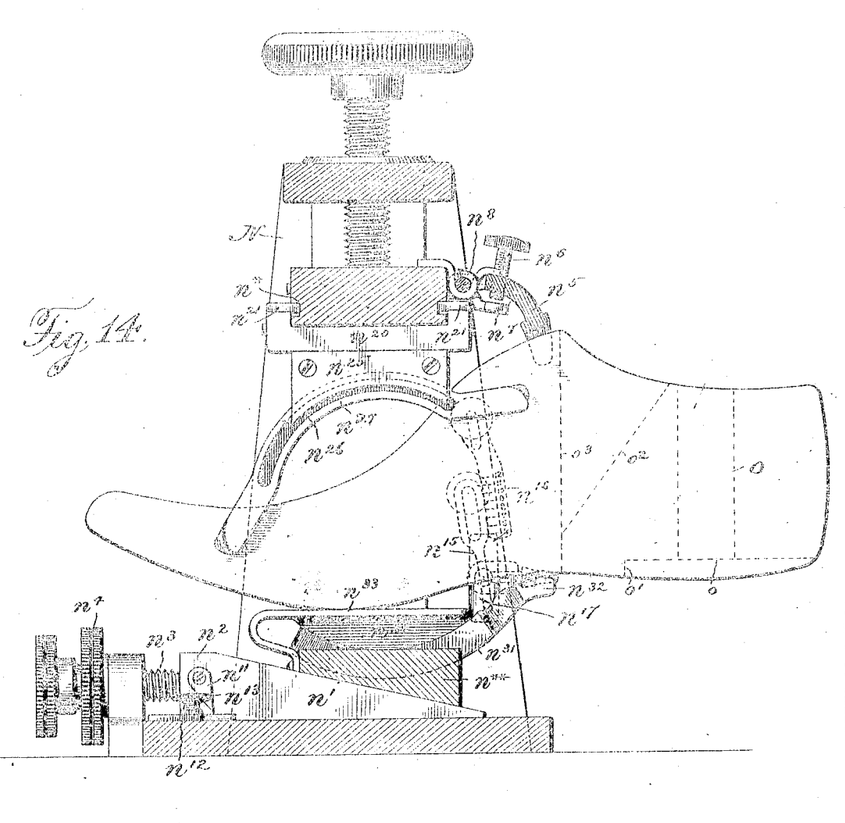
Fig. 14 is a longitudinal sectional view of the clamp above mentioned, showing a last in the clamp.
Figure 16:
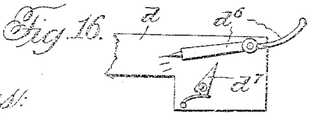
Fig. 16 is an enlarged view of the lever for setting the heel rest, such parts being shown in Fig. 3.

The object of the construction which is illustrated in Figs. 1 to 14, inclusive, is to provide a machine for preparing lasts to receive hinges for the making of hinged lasts, and particularly for the making of the hinged last that is the subject of the patent granted to me May 1st, 1900, No. 648,525.

The frame consists of a table A and a back plate B supported by leg frames that are connected by a base plate. On the back plate are five vertical guides $b$ and $b$ upon which are mounted brackets C, D, E, F and G. Vertical screw shafts $b'$ and $b'$ are journaled in bearings that are secured to the back plate above and below the guides, and the thread of each screw shaft engages a thread in one of the brackets. On the lower end of each screw shaft is a worm gear, and a horizontal worm shaft $b^2$ is mounted in bearings on the back plate and meshes with each worm gear. A crank on the end of the worm shaft has mounted beside it a scale plate $b^3$ on which are numerals that correspond to the sizes of the various lasts to be operated upon. Each bracket is provided with a preferably horizontal arm in which is an undercut guideway, and slides $c$, $d$, $e$, $f$ and $g$ are mounted in such guideways upon the respective brackets. In each bracket a screw shaft $b^4$ is mounted in bearings on the bracket, and engages a thread on the slide thereof so as to move the slide backward and forward on its guideway. Each screw shaft $b^4$ has a bevel gear $b^5$ thereon which meshes with a bevel gear $b^6$ that is splined on its respective shaft $b'$, the latter gear being confined between the bracket and a finger $b^7$ fastened thereto, so that it is kept in mesh with the gear $b^5$, while free to travel along the shaft $b'$ with the bracket.

On the slide of the bracket C, a spindle $c'$ is mounted in bearings that are parallel to the back plate. A stud $c^2$ is mounted in a bearing on the side of the bracket and has a hand lever $c^3$ and a forked arm $c^4$ secured thereon, the fork of the arm $c^4$ having pins which engage a groove in a collar that is secured on the spindle $c'$, so that, by the movement of the hand lever, the spindle can be thrust to the right and left in its bearings. A drill H is mounted on the end of the spindle.

The slide $d$ of the bracket D extends to the left of the bracket and is itself provided with a guideway $d'$ in which is mounted a heel rest $d^2$. The heel rest has a vertical back plate $d^3$ to which is secured a forked spring $d^4$ which projects forward over the back plate of the heel rest and is adapted to engage and position the heel of a last. A pin on the back plate $d^3$ is engaged by the slotted end of a lever $d^5$ that is fulcrumed on the slide $d$, and whose opposite arm is slotted and engages a pin on the bracket D. The lever $d^5$ causes the heel rest to move forward on the slide $d$ when the latter moves forward, and causes the heel rest to move rearward on the slide $d$ when the latter moves rearward. Upon the side of the heel rest a bottom gage is pivoted, such gage consisting of a lever $d^6$ whose forward end is bent laterally to engage the center of the instep of the last. The rearward end of the lever is pointed, and a scale is formed on the heel rest to indicate the position of the lever. An arm $d^7$ is pivoted on the heel rest beneath the lever, and is engaged by a flat spring which co-acts with flat surfaces upon the arm to hold the arm either in a vertical position, where the rearward end of the lever is elevated and the gage held out of contact with the last, or in an inclined position, where the lever is free to move.

The slide $d$ has a vertical apron $d^8$ whose lower edge is guided in a guideway $d^9$ on the bracket D. Upon the apron are horizontal guides $d^{10}$ in which is mounted a slide I. The latter slide is connected by a link $i$ with a third arm $c^5$ on the stud $c^2$, so that it is moved in its guides by the movement of the hand lever. The slide I has vertical bearings in which is mounted a spindle $i^2$. Upon the upper end of the said spindle is mounted a routing tool K, which is of a width equal to the slot in the heel part in which the hinge is to be placed. At the base of the routing tool is a countersink $k$ for countersinking the lower end of the jack-pin socket hole in the last. The spindle is swiveled to a yoke $i^3$, to which a link $i^4$ is pivoted, the lower end of the link being pivoted to a treadle $i^5$. An arm $i^6$ projects from the back plate B, and supports a pin which engages a slot in a lever $i^7$ that is pivoted on the apron $d^8$. The forward end of the lever is provided with a lug $i^8$ which is adapted to rest upon the upper surface of an arm $i^9$ on the yoke and to prevent the rising of the yoke and routing tool except when such lug is opposite a slot $i^{10}$ in the yoke when the latter is free to rise and carry the routing tool. A lever $i^{11}$ is pivoted on the apron and has a slot which is engaged by a pin $i^{12}$ that is supported by an arm $i^{13}$, the latter being fastened to the table. The upper end of the said lever carries a set screw which is adapted to be struck by and to limit the forward movement of the slide I. The rearward movement of the said slide is limited by a set screw $i^{14}$ on the apron $d^8$.

A lever $i^{15}$ is pivoted on an arm $i^{15*}$ projecting from the apron and one end thereof is adapted to be acted upon by the upper flat surface of an arm $i^{16}$ on the yoke. The opposite end of the lever is connected to a link $i^{19}$ whose upper end is pivoted to a rod $i^{17}$ which is mounted in a socket in a thrust arm $i^{18}$. The rod $i^{17}$ has a cross pin which projects through slots in the thrust arm, and which is normally held at the upper end of said slots by a spring $i^{20}$ interposed between the ends of such pin and a flange on the thrust arm. The thrust arm passes through a bearing in the slide $d$, and is bent over to bear upon the upper surface of the last. On the slide $e$ of the bracket E, a horizontal circular saw is mounted in such position, and is of such thickness as to cut away the material of the last to form the anvil heel seat as the last is moved past such saw. On the slide $f$ of the bracket F a circular saw $f'$ is mounted in a forwardly inclined position so as to form the saw cut on the forward face of the heel part of the last. On the slide $g$ of the bracket G is mounted a vertical circular saw $g'$ in position to sever the heel part from the fore-part of the last and form the vertical surface of the forepart. A guide $a$ extends along the table A in front of the row of brackets, and a second guide $a'$ is secured to the table perpendicular to the guide $a$ at the left end thereof. Preferably, beyond the bracket G a shaft L is mounted in horizontal bearings on the table, and guides $l$ and $l'$ are secured to the table perpendicularly to the said shaft. A saw $l^2$ is mounted upon the shaft L, and such saw is provided with teeth upon its outer periphery, having their cutting edges parallel to the shaft, and also with teeth projecting laterally from the face of the saw, and having their cutting edges perpendicular to the said shaft. A lug $l^3$ is formed on a plate which is adjustably fastened on the guide $l'$ by a screw passing through a slot in the said plate. To the right of the shaft L, a shaft M is mounted in bearings on the table, that are slightly inclined to the horizontal, and such shaft carries a circular saw $m$. A guide $m'$ perpendicular to the shaft is secured upon the table. A clamp N is provided for holding the last. The frame of such clamp consists of a rectangular base, having sides rising vertically therefrom, the sides being connected by a cross-piece at the top. The sides are provided with vertical guides, on which are mounted upper and lower heads $n^*$ and $n^{**}$, respectively that are provided with clamp jaws. The upper head is reciprocated by means of a hand screw, that is journaled therein. The lower head is adjusted vertically by means of a pair of wedges $n'$ which are received in inclined slots in the underside of the lower head, that are connected by a cross piece $n^2$, and which are adjusted by means of a hand screw $n^3$ that is journaled in a lug fastened to the base, and is threaded into the cross piece $n^2$. A lock nut $n^4$ is threaded on the screw $n^3$. The upper holder $n^5$ is pivoted between lugs that are screwed to the upper head. Such holder is preferably curved rearward and downward, and is provided with a V-shaped notch that is adapted to engage the comb of the last. A screw $n^6$ is threaded into the gage and is adapted to bear upon a lug $n^7$ formed in one of the bearings of the gage to limit the downward movement thereof. A spring $n^8$ coiled about a pin passing through ears in the gage and extending into the bearings, has one end bearing upon the gage and the other end upon the head, so that it tends to throw the gage downward. A lug $n^9$ is formed on one of the bearings of the gage, and a thumb screw $n^{10}$ is threaded into such lug and stands above the gage in position to limit the upward movement of the latter. The screw $n^{10}$ is provided with a lock nut. A pointer $n^{11}$ is secured to the side of one of the wedges $n^4$, and projects toward a scale plate $n^{12}$ resting on the base of the clamp. The scale plate is secured to the base by a thumb screw $n^{13}$ passing through a slot in the said scale plate, so that the scale plate can be adjusted forward and backward. On the sides of the clamp, opposite the instep, of the last, two holders $n^{13}$ and $n^{14}$ are fastened, and such holders are slotted vertically and receive wedges $n^{15}$ and $n^{16}$, the latter being adjustably secured in position by thumb screws passing through vertical slots in ears attached to the wedges. Scale plates $n^{16}$ and $n^{16}$ are adjustably secured beside the ears of the wedges by thumb screws passing through slots in the scale plates. A side gage $n^{17}$ having a round, slotted shank is adapted to straddle the wedge and to be received in a circular opening in the sockets, and such plate is fastened in desired position by a thumb screw $n^{18}$ threaded into the socket.

A slide $n^{20}$ is hung from the head $n^*$ by plates $n^{21}$ screwed to such slide and engaging grooves in the sides of the head. The said plates are secured on ribs formed on the slide $n^{20}$, the height of the ribs being such that a slight space preferably normally exists between the upper surface of such slide and the under surface of said head, and the grooves, being wider than the plates, so that the upper surface of the slide can be forced into firm contact with the lower surface of the head. A block $n^{22}$ is swiveled to the slide $n^{20}$, as by a cylindrical boss $n^{23}$ formed on the block $n^{22}$ and received in a cylindrical recess in the slide $n^{20}$, such boss having an annular groove $n^{24}$ formed therein which is engaged by pins driven into the slide. The groove is larger than the pins, so that the boss has vertical play in the block, and such groove is so positioned that the upper surface of the block is normally separated by a space from the lower surface of the slide, and so that it can, when desired, be forced into firm contact with such lower surface. The under surface of the block $n^{22}$ is preferably formed on the arc of a circle, and its end surfaces have screwed thereto plates $n^{25}$, which latter have arc-shaped flanges $n^{26}$, which are substantially parallel to the under surface of the block. An upper clamp jaw $n^{27}$ is hung from the flanges $n^{26}$, and such jaw preferably has a transversely flat and longitudinally arc-shaped body, in the sides of which are formed arc-shaped grooves $n^{28}$, in which are received the flanges $n^{26}$. The radius of the upper surface of the body of the upper clamp jaw is preferably slightly greater than that of the under surface of the block $n^{22}$. The width of the grooves $n^{28}$ is preferably greater than that of the flanges $n^{26}$, so that a space normally exists between the under surface of the block and the upper surface of the clamp jaw, and so that such surface can, when desired, be forced into firm contact. The clamp jaw $n^{27}$ has a forwardly projecting extension $n^{29}$, having a substantially V-shaped recess $n^{30}$ therein, the edge surfaces of such recess being preferably curved downward and outward. Such recess is preferably enlarged at its rear end. A similar extension projects rearward from the clamp body, and such projection has a recess similar to that formed in the forward extension.

The lower head $n^{}$ has formed in its upper surface a seat having vertical side walls and an arc-shaped bottom. A lower clamp jaw $n^{31}$ is mounted in said seat, and such jaw has arc-shaped upper and lower surfaces, the lower surface being preferably of longer radius than the surface forming the bottom of the recess in the head. The clamp jaw $n^{31}$ preferably has an outwardly and upwardly extending arm $n^{32}$ on its free edge, and such arm preferably has its upper surface rounded and slightly beveled laterally each way from its central portion. One beveled portion of such surface is adapted to engage the instep of a right last and the other beveled portion, the instep of a left last. A spring plate $n^{33}$ is secured to the head $n^{}$ by screws passing through ears on such plate and threaded into said head. The plate $n^{33}$ is bent upward and backward and is then extended horizontally forward over the head, and is provided with an opening through which the jaw $n^{31}$ can project. On the underside of the plate are formed or secured blocks $n^{34}$, which have arc-shaped under surfaces, which are preferably of greater radius than the upper surface of the lower clamp jaw. The plate $n^{33}$ normally holds the arc-shaped blocks out of firm contact with the upper surface of the clamp jaw. The arc-shaped blocks are spaced apart, and a spring $n^{35}$ is located between them and has its forward end in engagement with a hook on the under side of the plate $n^{33}$ and its rearward end in engagement with a hook on the clamp jaw. The spring tends to thrust the jaw out and upward from between the slide and the blocks $n^{34}$. As the head $n^*$ descends, the upper clamp jaw settles down upon the last so that the beveled surfaces of its V-shaped recesses rest upon opposite sides of the upper convex surfaces of the toe and heel parts of the last. The movement of the said clamp jaw with reference to the head $n^*$, in taking the desired position, is capable of resolution into (1) a tilting movement longitudinally of the last, which movement is permitted by the connection between the jaw and the block $n^{22}$ consisting of the arc-shaped flanges $n^{26}$ and the grooves $n^{28}$; (2) an axial movement, which movement is permitted by the swiveling of the block $n^{22}$ to the slide $n^{20}$, and (3) a movement transversely of the last, which movement is permitted by the connection between such slide and the head $n^*$ consisting of the plates on the slides and the grooves on the head. During such movement of the said head the lower clamp jaw $n^{31}$ which is normally thrust out of its recess by the spring $n^{34}$ is forced by contact with the last back into the recess between the blocks $n^{34}$ and the head $n^{**}$. Further movement of the lower head causes the spring plate $n^{33}$ to come against the sole of the last, preferably the ball thereof. The final tightening of the screw forces the upper surface of the upper clamp jaw into firm contact with the under surface of the block $n^{22}$, thus locking such parts together, and preventing the tilting of the clamp jaws. It also forces the upper surface of the block $n^{22}$ into firm contact with the lower surface of the slide $n^{20}$, thus locking such block to said slide and preventing the axial movement of the clamp jaw. The final tightening of the screw also forces the upper surface of the slide $n^{20}$ into firm contact with the under surface of the head $n^*$, thus locking such slide and said head together and preventing movement of the upper clamp jaw transversely of the last. During the final tightening of the screw, the spring plate $n^{33}$ is bent by the sole of the last, causing the lower clamp jaw to be impinged upon by and firmly held between the arc-shaped seat in said head and the blocks $n^{34}$ attached to such spring plate. The last has now been firmly clamped.

In the operation of my machine, the clamp jaws are separated, the last is placed between them, and the clamp is placed in the angle between the guides $a$ and $a'$. The heel of the last is held firmly on the heel rest and in engagement with the forked spring $d^4$. The arm $d^7$ is drawn down to leave the bottom gage $d^6$ free to come in contact with the lower portion of the instep. The wedges $n'$ and $n'$ are then adjusted until the lever $d^6$ points to the mark on its scale which indicates that the instep is at the proper level to correctly position the cuts in the fore-part and forward portion of the heel part of the last. The last is tipped laterally until it has the proper vertical position. The side gage $n^{17}$ is then moved outward to contact with the last by moving the wedge $n^{15}$ downward, and is then clamped by the thumb screw in the holder $n^{14}$. The hand screw of the clamp is then turned, thus forcing the upper gage down upon the comb of the last, and bringing the comb and the rear portion of the heel in a line through the center of the clamp, and causing the clamp jaws to firmly grasp the last. The scale plates for the side gage and for the pointers on the wedges are then adjusted, so that the number corresponding to the length of the last is opposite the mark on the wedge of the side gage and the pointer on the wedge $n'$, respectively. These scales, now having been properly positioned for one size of last, can be used to properly position the wedges $n'$ and the side gage $n^{17}$ for other lasts of the same proportions, by merely adjusting the side gage wedge and the pointer on the wedge $n'$ to numbers on the scale plates corresponding to the length of the last. The bottom or instep gage will thus be seen to be used only in positioning the wedges correctly for the first last of a series of lasts to be cut, and the wedges can then be afterward properly adjusted for the other lasts of the series, by the use of the now properly-adjusted scale plates. The last, being now firmly and properly held in the clamp and the heel rest, the treadle is depressed, causing the routing tool to enter the last at the forward portion of the intended slot in the heel part. The hand lever is then drawn forward, causing the routing tool to pass rearward, the level of the routing tool being determined by the level of the lug $i^8$ on the lever $i^7$ coming in contact with the upper surface of the arm $i^9$ on the yoke. The routing tool thus passes rearward until the lug on said lever is opposite the slot or opening $i^{10}$ in the said arm, when the routing tool can be forced upward by a further depression of the treadle, thus causing the routing tool to bore the hole O for the jack pin socket, and causing the countersink to countersink the lower end thereof. As the routing tool rises, the lever $i^{15}$ is moved by the arm $i^{16}$ to yieldingly bear down the thrust arm upon the upper side of the last, to counteract the tendency of the routing tool to raise the last. At the same time the routing tool is passing rearward, the drill H is forced through the last laterally to form the hole for the pin which secures the hinge in the last. The clamp is now moved to the right along the guide $a$ past the saw $e$, and the latter cuts away the material as indicated by the lines $o$ and $o'$ to form the seat for the anvil heel seat of the last. The clamp, upon continuing the movement in the same direction, carries the last past the saw $f$ and the saw-cut $o^2$ forming the beveled forward face of the heel part is made. Further movement of the clamp along the guide $a$ causes the saw $g$ to sever the now-completed heel part from the fore part as indicated by the lines $o^3$. The clamp is then moved along the guide $l$ carrying the rear face of the fore part against the saw $l^2$, which latter, during rearward movement, forms the vertical and rear walls of the hinge slot in the fore part. The clamp is then moved along the guides parallel to the shaft L, and the lateral teeth of the saw cut the arc-shaped groove in the vertical wall of the hinge slot. During this movement, the lug $l^3$ enters a hole in the side of the clamp. The lug serves to prevent the lateral movement of the clamp until the saw has entered the fore part far enough to bring the lug opposite the said hole. The clamp is then moved laterally to disengage the fore-part from the lateral teeth of the saw, and then drawn forward to withdraw the saw from the slot. The clamp is then moved along the guide $m'$, and forces the fore-part against the inclined saw $m$, thus causing the inclined wall of the fore part slot to be formed and completing the wood work of the last.

When the crank of the worm shaft is turned in one direction, the brackets are carried upward, and their slides are carried forward toward the guide $a$, thus bringing all the tools into positions with reference to the said guide for operating upon a smaller size last and vice versa. When the bracket D moves forward for a smaller size last, the heel rest is carried forward, as before described. The slide I will be properly limited in its forward movement by adjustment of the set screw on the lever $l^{11}$, by means of the coaction of the lug $l^{12}$ on the arm $l^{13}$ with the cam slot in the said lever. The vertical thrust of the routing tool will also be properly changed by the coaction of the pin on the arm $l^6$ with the slot in the lever $d^7$.

It is obvious that various changes can be made in the mechanism illustrated above which are within the scope of my invention.

Having thus described my invention, what I claim is:—

1. In a machine for making lasts, the combination of a gage adapted to engage the heel of the last, a gage adapted to engage the comb of the last, a gage adapted to engage the side of the last at a point substantially below the comb of the last, a part upon which the last is adapted to rest while engaged by said gages, means for clamping the last in the position determined by said gages, said gages being so mounted as to be unaffected in their gaging engagement by the operation of the clamping means, and means for guiding tools in definite relations to the part holding said last.

2. In a machine for making lasts, the combination of clamping means for the last, heel, comb and side gages for positioning the last in the clamping means, said gages being so mounted as to be unaffected in their gaging engagement by the operation of the clamping means, said clamping means accommodating themselves to and clamping the last in the position determined by said gages and means for causing movement of a tool in a definite relation to said clamping means while the last is held in said means.

3. In a machine for making lasts, the combination of a base, a last supporting surface on said base, heel and comb gages to position the heel and comb of the last, a side gage to determine the lateral position of the last on said base, and clamping means arranged to accommodate itself to the last and to clamp the last in the position determined by said gages, said gages being so mounted as to be unaffected in their gaging engagement by the operation of the clamping means.

4. In a machine for making lasts, the combination of a heel rest having a gage for positioning the rear portion of the heel of a last, a clamp frame having a gage for positioning the comb of the last, a side gage against which the side of the last can be placed, and means for clamping the last in the position determined by said gages, said gages being so mounted as to be unaffected in their gaging engagement by the operation of the clamping means.

5. In a machine for making lasts, the combination of a heel rest, a clamp frame having a vertically adjustable support for the fore-part of the last, a gage adapted to contact with the sole of the last for indicating when the edge of the heel is horizontal, and means for clamping the last, which are adjustable, to clamp the last when the edge of the heel is horizontal and to hold it clamped independently of the gage.

6. The combination of a clamp for holding the last, said clamp having a gage adapted to engage the comb of the last, and a gage adapted to engage the side of the last, and a heel support having a gage adapted to engage the rear upper corner of the last, substantially as and for the purpose described.

7. The combination with a clamp, having gages that are, respectively adapted to engage the comb and the side of the last, of a support for the heel of the last having a gage adapted to engage the rear surface of the last, and having an adjustable gage adapted to engage the rear upper corner of the last, substantially as described.

8. A clamp for a last comprising a rectangular frame, and means within said frame for clamping a last, whereby when the last is clamped in said frame it can be presented to wood-working tools as if it were a rectangular block.

9. A clamp for a last consisting of a base, a block carried by said base and adapted to support the sole of the last, a jaw mounted between said block and said base, said jaw having upper and lower cylindrical surfaces concentric with a point above said block, the surfaces between which said jaw moves being curved to correspond to said jaw, and means for forcing the last upon said block, whereby said jaw may be moved until it touches the sole of the last and may then be clamped by the pressure upon said last.

10. A clamp for a last consisting of a frame, an upper clamping jaw, means on said frame for moving said jaw toward the base thereof, a concave cylindrical seat formed in said base, a jaw mounted in said seat and having upper and lower cylindrical surfaces concentric with a point above said block, and a block having a convex cylindrical surface adapted to bear upon the upper side of said jaw, said block being adapted to support a last.

11. A clamp for a last consisting of a frame, an upper clamping jaw, means on said frame for moving said jaw toward the base thereof, a concave cylindrical seat formed in said base, a jaw mounted in said seat and having upper and lower cylindrical surfaces concentric with a point above said block, a block having a convex cylindrical surface adapted to bear upon the upper side of said jaw, said block being adapted to support a last, and a spring tending to move said lower jaw toward the position of the last.

12. In a tool for making lasts, the combination of a frame, a clamp jaw and means for forcing such jaw toward the last, said jaw having convex points or projections formed thereon by which it can adapt itself to the irregular surface of the last, said jaw being slidably mounted on said means for forcing it toward the last to move in a direction transverse to the clamping movement, whereby the jaw can first adapt itself to the last and then be clamped in adjusted position as it is forced against the last.

13. In a tool for making lasts, the combination of a clamp jaw so shaped as to contact with the last at a plurality of spaced points, and means for forcing such jaw toward the object to be clamped, such jaw and said means having opposing surfaces which are disposed transversely to the direction of pressure of said means, such surfaces being capable of being brought into firm contact by said means, and gages for positioning the last on its support so arranged as to be unaffected by the clamping action, said clamping means accommodating themsleves to and clamping the last in the position determined by said gages.

14. In a tool for making lasts, the combination of a clamp jaw, a block having a connection with said jaw by which the latter can tilt, a slide to which said block is swiveled, a head on which such slide is mounted, and means for forcing such head toward the object to be clamped, such jaw and block, said block and slide, and such slide and said head having opposing surfaces disposed transversely to the line of pressure of such forcing means, and said parts being capable of forcing such surfaces into firm contact with each other, substantially as and for the purpose described.

15. In a tool for making lasts, the combination of a heel rest, a clamp for engaging the fore-part of the last, guides for positioning the clamp and heel rest relative to each other, whereby the last can first be adjusted in the heel rest and clamp and then secured in the clamp, and whereby the clamp can then be detached from the heel rest and used for presenting the last to the cutters.

16. In a clamp for lasts, the combination of a frame, a support for the sole of the last adjustably carried by said frame, a jaw above the last, said jaw being forked at its forward and rearward ends and having a convex upper surface, said forked ends of said jaw being adapted to contact with a last, at spaced points upon opposite sides of the comb and toe portion, a block having a concave surface adapted to fit the upper surface of said jaw, and means for forcing said block toward the last.

17. In a clamp for lasts, the combination of a frame, a support for the last, upper and lower jaws having their surfaces most remote from the last convexly curved on the arcs of circles whose centers are between the jaws, said jaws having faces constructed and arranged to contact with and hold a last, supports for said jaws having concave surfaces agreeing with and adapted to engage said convex surfaces, and means for forcing said jaws together.

18. In a clamp for lasts, the combination of a frame, a support for the sole of the last, said support being formed in two parts, a slideway formed between said parts and curved from a center above the support, a curved jaw seated in said slideway, and means for forcing the last down upon said support.

19. In a clamp for lasts, the combination of a frame, a support for the sole of the last, a head movable up and down above the last, a block transversely slidable upon said head, a block swiveled to said first-mentioned block, said last-mentioned block having a concave lower surface, an upper jaw forked at its forward and rearward ends and having a convex upper surface adapted to fit said concave surface on said last-mentioned block, means for loosely supporting said clamp from said block, and means for forcing said head toward the last.

20. In a machine for making lasts, the combination of a base adapted to support a last, gages for the heel, comb and side of the last, which gages are adapted to occupy fixed positions relative to said base, clamping jaws, and means for moving said jaws against a last while positioned against said gages, said jaws and means being so constructed as to permit said jaws to automatically adjust themselves to the last before being clamped and to then cause them to be clamped.

21. In a tool for making lasts, the combination of a clamp jaw, and means for forcing such jaw toward the object to be clamped, said jaw being automatically adjustable transversely to the direction of pressure of said means, substantially as and for the purpose described.

22. In a tool for making lasts, the combination of a clamp jaw and a head that are laterally immovable with relation to the object to be clamped, and a second clamp jaw interposed between and laterally movable with relation to said first-mentioned jaw and said head, such first-mentioned jaw and said head being capable of movement toward each other to clamp them between such second jaw, substantially as and for the purpose described.

23. In a machine for making lasts, the combination of a base, a last-supporting surface on said base, a tool supported in said machine, a heel gage adapted to preliminarily position the foot-shaped contour of the last relative to said tool and base, and clamping means having relatively movable members constructed to engage the last at a plurality of spaced points and automatically adjust themselves to the shape and position of the last, to permit the last to be accurately clamped to said base after being positioned thereon.

24. In a machine for making lasts, the combination of a heel rest, a base, a tool supported in said machine, a last-supporting surface on said base, a gage on said heel rest adapted to preliminarily position the foot-shaped contour of the last relative to said tool and base, and clamping means comprising an upper jaw constructed to engage a last at a plurality of spaced points, and a lower jaw, said jaws being movable to adapt themselves to the shape of the last, and means to actuate one of said jaws to clamp the last to the base and against the other jaw, after the last has been positioned on said base.

In testimony that I claim the foregoing I have hereunto set my hand this 14th day of August, A. D. 1901.

EDWIN J. PRINDLE.

Witnesses:
 HENRY C. HAZARD,
 JAS. E. HUTCHINSON.